United States Patent
Kalevo

(10) Patent No.: US 8,446,480 B2
(45) Date of Patent: May 21, 2013

(54) EXPOSURE CONTROL BASED ON IMAGE SENSOR COST FUNCTION

(75) Inventor: Ossi Mikael Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 756 days.

(21) Appl. No.: 12/519,719

(22) PCT Filed: Dec. 20, 2006

(86) PCT No.: PCT/IB2006/054978
§ 371 (c)(1),
(2), (4) Date: Feb. 26, 2010

(87) PCT Pub. No.: WO2008/075136
PCT Pub. Date: Jun. 26, 2008

(65) Prior Publication Data
US 2010/0165135 A1     Jul. 1, 2010

(51) Int. Cl.
*H04N 5/235*     (2006.01)

(52) U.S. Cl.
USPC ............................. 348/221.1; 348/229.1

(58) Field of Classification Search
USPC ...... 348/221.1, 229.1, 224.1, 227.1, 362–366, 348/370, 222.1; 382/168, 172, 274
See application file for complete search history.

(56) References Cited

U.S. PATENT DOCUMENTS

| | | | |
|---|---|---|---|
| 4,843,476 A | 6/1989 | Fujioka et al. | 358/228 |
| 5,194,960 A | 3/1993 | Ota | 358/228 |
| 5,227,835 A | 7/1993 | Anagnostopoulos | 354/412 |
| 6,080,104 A | 6/2000 | Ozawa et al. | 600/180 |
| 6,486,915 B2 | 11/2002 | Bell et al. | 348/362 |
| 6,518,998 B1 | 2/2003 | Christoff et al. | 348/216.1 |
| 6,665,010 B1 * | 12/2003 | Morris et al. | 348/297 |
| 6,667,765 B1 | 12/2003 | Tanaka | 348/229.1 |
| 6,885,405 B1 * | 4/2005 | Steinberg et al. | 348/371 |
| 7,474,847 B2 | 1/2009 | Nikkanen et al. | |
| 8,013,909 B2 | 9/2011 | Nikkanen et al. | 348/229.1 |
| 2001/0004400 A1 | 6/2001 | Aoki et al. | 382/107 |
| 2002/0006163 A1 | 1/2002 | Hibi et al. | 375/240.16 |
| 2002/0039137 A1 | 4/2002 | Harper et al. | 348/207 |

(Continued)

FOREIGN PATENT DOCUMENTS

| | | |
|---|---|---|
| EP | 0 219 658 A1 | 4/1987 |
| EP | 0 341 921 A2 | 11/1989 |

(Continued)

OTHER PUBLICATIONS

Meyer, "The Future of Digital Imaging—High Dynamic Range Photography", Cybergrain, Feb. 2004. http://www.cybergrain.com/tech/hdr/.

(Continued)

*Primary Examiner* — Lin Ye
*Assistant Examiner* — Euel Cowan
(74) *Attorney, Agent, or Firm* — Harrington & Smith

(57) ABSTRACT

The present invention relates to a method, a computer-readable medium, a computer program and an apparatus for exposure control. A histogram of the number of image sensor area elements of an image sensor that receive light at specific light reception rates from an image target is determined. At least one exposure time is determined for capture of said image target based on said histogram and on a cost function that expresses a performance of said image sensor as a function of light reception rate per image sensor area element and exposure time.

18 Claims, 4 Drawing Sheets

U.S. PATENT DOCUMENTS

| | | |
|---|---|---|
| 2002/0064297 A1 | 5/2002 | Brunk et al. .................. 382/100 |
| 2003/0095189 A1 | 5/2003 | Liu et al. |
| 2003/0098914 A1 | 5/2003 | Easwar ...................... 348/229.1 |
| 2003/0098922 A1 | 5/2003 | Barkan ......................... 348/362 |
| 2004/0170303 A1 | 9/2004 | Cannon |
| 2005/0248660 A1 | 11/2005 | Stavely et al. ........... 348/208.16 |
| 2008/0043112 A1 | 2/2008 | Nikkanen et al. |

FOREIGN PATENT DOCUMENTS

| | | |
|---|---|---|
| EP | 0 810 551 A1 | 5/1996 |
| EP | 0 886 439 A2 | 12/1998 |
| EP | 1 035 510 A2 | 2/2000 |
| EP | 1202563 A | 5/2002 |
| JP | 2001250348 A | 9/2001 |
| KR | 1999-002387 | 1/1999 |
| WO | WO 01/87377 A2 | 11/2001 |
| WO | WO 2005/001563 A1 | 1/2005 |

OTHER PUBLICATIONS

Catrysse, et al., "High Dynamic Range Image Processing", Final Project, Stanford University, Mar. 13, 1998. http://ise.stanford.edu/class/psych221/projects/98/DynRange/new%20presentation/index_story.htm.

International Search Report and Written Opinion of the International Searching Authority for PCT Application No. PCT/IB2006/054978, dated Jun. 11, 2007, 10 pages.

\* cited by examiner

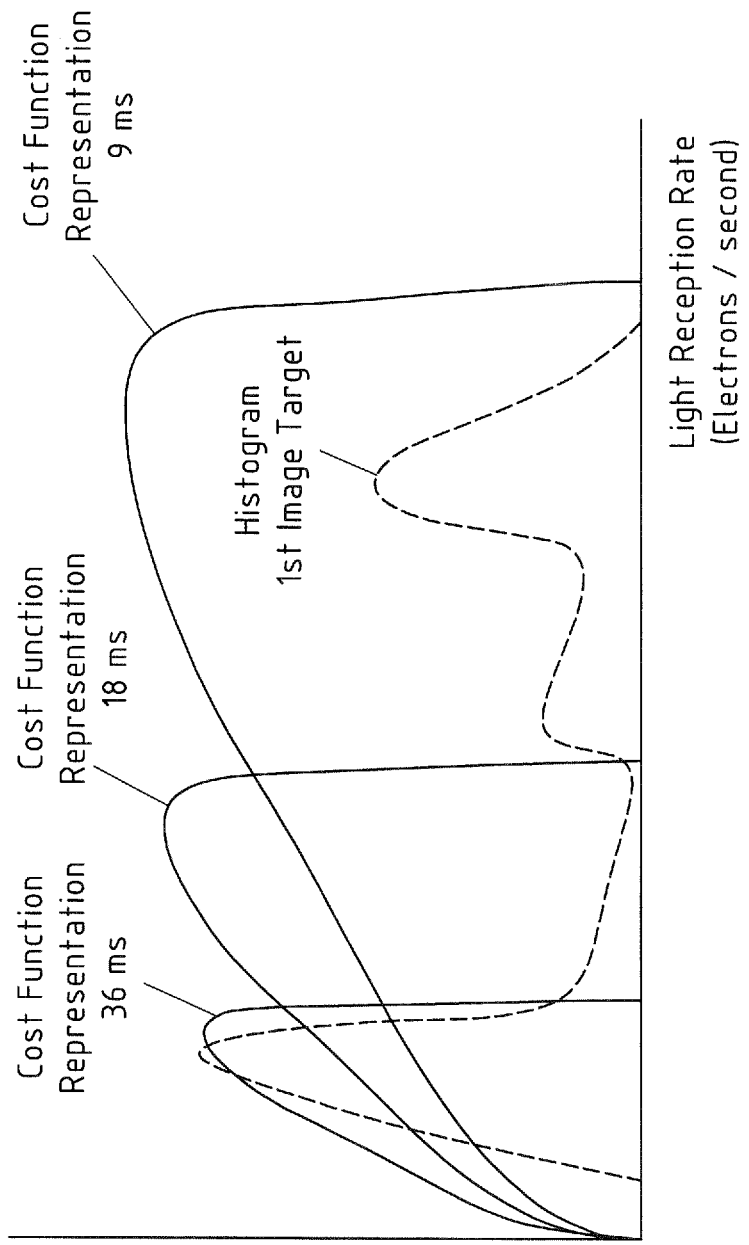

EXPOSURE CONTROL BASED ON IMAGE SENSOR COST FUNCTION

RELATED APPLICATION

This application was originally filed as and claims priority to PCT Application No. PCT/IB2006/054978 filed on 20 Dec. 2006.

FIELD OF THE INVENTION

This invention relates to a method, a computer-readable medium, a computer program and an apparatus for exposure control.

BACKGROUND OF THE INVENTION

Exposure control is, inter alia, required in the context of digital photography, where a target image is captured through a lens by using an image sensor, such as for instance a Charge Coupled Device (CCD) or Complementary Metal-Oxide Semiconductor (CMOS) image sensor. Such image sensors are for instance installed in digital cameras such as Digital Still Cameras (DSC) or in electronic devices that offer a camera function, such as for instance a mobile phone. Therein, exposure control determines the exposure time during which the target image is captured by the image sensor.

Exposure control is particularly demanding if the dynamic range of an image sensor is limited. Therein, the dynamic range of an image sensor may be understood as the ratio between high and low extremes in a set of intensity values that can be captured by the image sensor. In case of limited dynamic range, the problem arises that details in the bright area have to be traded against details in the dark area. With a large exposure time, the pixels of the image sensor associated with bright parts of the captured image will be driven into saturation, so that there are no details in the bright part, whereas with a small exposure time, the pixels of the image sensor associated with the dark parts of the captured image will only receive small or none activation at all, so that there are no details in the dark part.

To avoid image degradation due to limited dynamic range, High Dynamic Range (HDR) cameras have been proposed, providing dynamic ranges of 12-20 bits per color component compared to the 6-12 bits per color component offered by normal cameras.

A first type of HDR cameras achieves increased dynamic range by providing an image sensor with high and low sensitivity pixels in the sensor.

A second type of HDR cameras extends the dynamic range by merging image data of two or more images that have been captured with different exposure times (e.g. one short exposure time for capturing details in the bright part of the image and one long exposure time for capturing details in the dark part of the image). In this way, a single high-dynamic range image can be created. It is readily understood that the two or more images have to be captured within a short time period to avoid generation of motion artifacts. In this second type of HDR cameras, properly controlling the exposure time used for the capture of the single images that are to be merged into a high-dynamic range image is of crucial importance for the quality of the merged high-dynamic range image.

SUMMARY

It is, inter alia, an object of the present invention to provide a method, computer program, computer program product and apparatus for exposure control.

According to a first aspect of the present invention, a method is disclosed, comprising determining a histogram of the number of image sensor area elements of an image sensor that receive light at specific light reception rates from an image target; and determining at least one exposure time for capture of the image target based on the histogram and on a cost function that expresses a performance of the image sensor as a function of light reception rate per image sensor area element and exposure time.

According to a second aspect of the present invention, a computer program is disclosed, comprising instructions operable to cause a processor to determine a histogram of the number of image sensor area elements of an image sensor that receive light at specific light reception rates from an image target; and instructions operable to cause a processor to determine at least one exposure time for capture of the image target based on the histogram and on a cost function that expresses a performance of the image sensor as a function of light reception rate per image sensor area element and exposure time. The computer program may for instance be stored in the memory of a processor of a digital camera or an electronic device that is equipped with a digital camera and may be executed by the processor.

According to a third aspect of the present invention, a computer-readable medium having a computer program stored thereon is disclosed, the computer program comprising instructions operable to cause a processor to determine a histogram of the number of image sensor area elements of an image sensor that receive light at specific light reception rates from an image target; and instructions operable to cause a processor to determine at least one exposure time for capture of the image target based on the histogram and on a cost function that expresses a performance of the image sensor as a function of light reception rate per image sensor area element and exposure time. The computer-readable medium may for instance be an optic, electric, magnetic or electromagnetic storage medium, which may be fixedly attached to or removable from an apparatus that contains the processor that executes the computer program stored on the computer-readable medium.

According to a fourth aspect of the present invention, an apparatus is disclosed, comprising a processing unit configured to determine a histogram of the number of image sensor area elements of an image sensor that receive light at specific light reception rates from an image target; and to determine at least one exposure time for capture of the image target based on the histogram and on a cost function that expresses a performance of the image sensor as a function of light reception rate per image sensor area element and exposure time.

The present invention further relates to an apparatus, comprising means for determining a histogram of the number of image sensor area elements of an image sensor that receive light at specific light reception rates from an image target; and means for determining at least one exposure time for capture of the image target based on the histogram and on a cost function that expresses a performance of the image sensor as a function of light reception rate per image sensor area element and exposure time.

The apparatuses according to the present invention may for instance be a digital camera, or an electronic device that is equipped with a digital camera. Equally well, said apparatus may be a camera module, an external accelerator, an imaging engine, an application processor, or a baseband processor, to name but a few possibilities.

According to the present invention, a histogram is determined. Each ordinate value of this histogram, which is associated with a specific light reception rate as abscissa value, indicates the number of image sensor area elements of an image sensor that receive light at this specific light reception rate from an image target. Therein, the image sensor may for instance be a CCD or CMOS image sensor, and the image sensor area elements may for instance be pixels or groups of pixels of the image sensor. The image sensor may for instance be contained in a digital camera or in an electronic device that is equipped with a digital camera, such as for instance a mobile phone. The light reception rate expresses at which rate light is received by the image sensor area elements. Therein, the light reception rate may relate to single color component of the received light, or to all color components. The light reception rate may for instance be measured in photons per time unit, or in electrons per time unit, reflecting that the image sensor area elements output electrons in response to the reception of photons as defined by the quantum efficiency of the image sensor area elements.

The histogram thus may provide an impression which light reception rates are experienced by a large number of pixels of the image sensor and which are not.

The determining of the histogram may for instance be based on image data gathered prior to actual image capture of the image target, for instance from a viewfinder image, or on image data gathered at least partially during actual image capture.

During or after the determining of the histogram, at least one exposure time for image capture of the image target is determined based on the histogram and on a cost function. Therein, the cost function expresses the performance of the image sensor as a function of light reception rate and exposure time. For a specific exposure time, the cost function then degenerates to a function of the light reception rate only. Therein, the cost function may of course depend on further parameters, as for instance an analog gain of the image sensor. As with the histogram, also the light reception rate, which, for a specific exposure time, serves as an abscissa for the cost function, may for instance relate to a single color component or to all color components, and may for instance be expressed in terms of photons per time unit or electrons per time unit. Representations of the cost function, for instance for different exposure times, may be fixedly stored in a memory, but may equally well also be determined anew in certain intervals, for instance if image sensor parameters have changed. The cost function may, inter alia, consider noise characteristics and/or nonlinearities of the image sensor.

Determination of the at least one exposure time thus may exploit that the histogram reveals how many image sensor area elements receive light at small, medium or large light reception rates, and that the cost function indicates for which light reception rate or rates and for which exposure time the image sensor has optimum performance. By combining information on both the histogram and the cost function, thus a suited exposure time can be determined.

According to a first aspect of the present invention, the determining of the at least one exposure time is based on the histogram and on a plurality of cost function representations, wherein each of the cost function representations expresses a performance of the image sensor as a function of light reception rate per image sensor area element for a specific exposure time. Equally well, the determining of the at least one exposure time may be based on the histogram and only one cost function representation. The one or more cost function representations may be available prior to the determining of the at least one exposure time, or may be determined or generated during said determining of the at least one exposure time, for instance based on a mathematical model of the cost function and/or on already available cost function representations.

Therein, at least one of the cost function representations may for instance be based on measurements, or on an analytical model of the cost function. Equally well, at least one of the cost function representations may be obtained from interpolation or extrapolation of other cost function representations.

According to a second exemplary embodiment of the present invention, which is based on the first exemplary embodiment of the present invention, only one exposure time is determined, and the one exposure time is determined by selecting, based on the histogram, a cost function representation out of the plurality of cost function representations and by determining the specific exposure time of the selected cost function representation as the one exposure time.

In this selection of the cost function representation (and the associated exposure time), the determined histogram is considered, so that an exposure time may be selected that is associated with a cost function representation which has a good performance in one or more specific ranges of light reception rates that are experienced by a large number of pixels in the image sensor when the image is captured. For instance, if the histogram reveals that a large number of pixels receive light at large light reception rates, a cost function representation may be selected that indicates high performance of the image sensor for large light reception rates, wherein this cost function representation may for instance be a cost function representation for a small exposure time.

In the second exemplary embodiment of the present invention, the selecting of the cost function representation may comprise: for each cost function representation in the set of cost function representations, multiplying, for a range of light reception rates, the respectively associated histogram value and the respectively associated value of the cost function representation and summing up the resulting multiplication products to obtain a sum value; comparing the sum values of all cost function representations in the set of cost function representations to identify the largest sum value, and selecting the cost function representation that produced the largest sum value. In this way, the exposure time is determined in a way that an optimal match of the performance of the image sensor to the exposure requirements of the image target is achieved.

According to a third exemplary embodiment of the present invention, first and second exposure times for respective first and second captures of the image target are determined. Determining two or even more exposure times is for instance advantageous if multiple captures of the same image target shall be performed to increase the dynamic range.

In this third exemplary embodiment, one of the first and second exposure times may be determined, based on the histogram and on the cost function, as the largest possible exposure time that still does not cause pixel saturation. This may for instance be the smaller exposure time of the first and second exposure time.

According to a fourth exemplary embodiment of the present invention, the third exemplary embodiment of the present invention further comprises: capturing the image target with the first exposure time to obtain a first image; capturing the image target with the second exposure time to obtain a second image, and merging image data of the first and second images into a third image. By capturing the first and second image with different exposure times and merging the image data of the resulting first and second images into image data of the third image, the dynamic range—compared to the single image capture case—can be extended. For instance, if the first image is captured with a small exposure time, and the second image is captured with a large exposure time, the first image may be likely to show few details in dark image portions and more details in bright image portions, whereas the second image may be likely to show more details in the dark portions and few details in the bright image portions (due to saturation), so that combining image data relating to the bright image portions of the first image and image data relating to the dark portions of the second image yields a third image with extended dynamic range. Thus an increase in dynamic range is achieved without requiring an increase in the bit depth of an analog-to-digital converter that converts the output signals of the image sensor into digital values for further processing.

In the fourth exemplary embodiment of the present invention, the capturing with the first exposure time and the capturing with the second exposure time may be temporally non-overlapping or temporally overlapping. The temporally non-overlapping capture may for instance be achieved by subsequent image captures. The temporally overlapping capture may for instance be achieved by using two images sensors, or by using only one image sensor for the capture of both images. The image with the larger exposure time may then for instance be derived from the image with the smaller exposure time, for instance by means of multiplication with one or more factors. It is also possible that two exposures are captured partially at the same time. The values over some threshold (thr, if this value is digitized) are clipped after a first (longer) exposure time (t1), and then the exposure with a second (shorter) exposure time (t2) is immediately continued. The pixels after these two exposures are AD converted, and so the digitized pixel values (x) are produced using the known nonlinear sensor response that can be linearized (y) afterwards. The nonlinear pixel response may then for instance be linearized by using the following equations:

If$(x<\text{thr}*(t1+t2)/t1)$then $y=x$ else $y=(x-\text{thr})*(t1+t2)/t2$

In the fourth exemplary embodiment of the present invention, the merging of the image data of the first and second image may comprise: in case of image data of the second image falling below a pre-defined threshold, using the image data of the second image as image data for the third image; and in case of image data of the second image equaling or exceeding the pre-defined threshold, using a scaled representation of image data of the first image as image data for the third image, wherein the ratio between the second exposure time and the first exposure time is used as scaling factor.

In the fourth exemplary embodiment of the present invention, the merging of the image data of the first and second image may alternatively comprise: in case of a difference between image data of the second image and a scaled representation of image data of the first image falling below a pre-defined threshold, using the image data of the second image as image data for the third image, wherein the ratio between the second exposure time and the first exposure time is used as scaling factor; and in case of the difference between the image data of the second image and the scaled representation of the image data of the first image equaling or exceeding the pre-defined threshold, using the maximum value of the image data of the second image and the scaled representation of the image data of the first image as image data for the third image.

According to a fifth exemplary embodiment of the present invention, first and second exposure times for respective first and second captures of the image target are determined by selecting, based on the histogram, first and second cost function representations out of the plurality of cost function representations and by determining the specific exposure times of the selected first and second cost function representations as the first and second exposure times.

In this fifth exemplary embodiment of the present invention, the selecting of the first and second cost function representations may comprise: forming a plurality of different combinations of two cost function representations out of the plurality of cost function representations; determining, for each combination of cost function representations, a sum value by applying a maximum-value function to the two cost function representations to obtain a maximum-value cost function representation, by multiplying, for a range of light reception rates, the respectively associated histogram value and the respectively associated maximum-value cost function representation value and by summing the resulting products; and selecting the two cost function representations of that combination of cost function representations that yields the largest sum value. Therein, the maximum-value function selects, for each abscissa value of the two cost function representations, the larger of the two respectively associated cost function representation values.

A sixth exemplary embodiment of the present invention further comprises detecting motion of at least one of the image target and the image sensor; and weighting the cost function representations in dependence on the detected motion prior to or during the determining of the at least one exposure time. In this way, the cost function representations also reflect the impact of motion during image capture. It may also be possible that the cost function representations are weighted with motion without actual motion detection (e.g. if a sport mode is selected).

In this sixth exemplary embodiment of the present invention, the weighting of the cost function representations may depend on the specific exposure times of the cost function representations. For instance, cost function representations associated with larger exposure times may be weighted by multiplication with smaller factors than cost function representations associated with shorter exposure times.

According to a seventh exemplary embodiment of the present invention, the performance of the image sensor is related to a signal-to-noise ratio of the image sensor.

According to an eighth exemplary embodiment of the present invention, the cost function expresses a performance of the image sensor as a function of light reception rate per image sensor area element, exposure time and analog gain of the image sensor, and wherein at least one exposure time and at least one analog gain for capture of the image target are determined based on the histogram and on the cost function.

These and other aspects of the invention will be apparent from and elucidated with reference to the embodiments described hereinafter.

BRIEF DESCRIPTION OF THE FIGURES

In the figures show:

FIG. 4a: an example of a histogram for an image target and of three cost function representations according to the present invention.

DETAILED DESCRIPTION OF THE INVENTION

Figure 1:
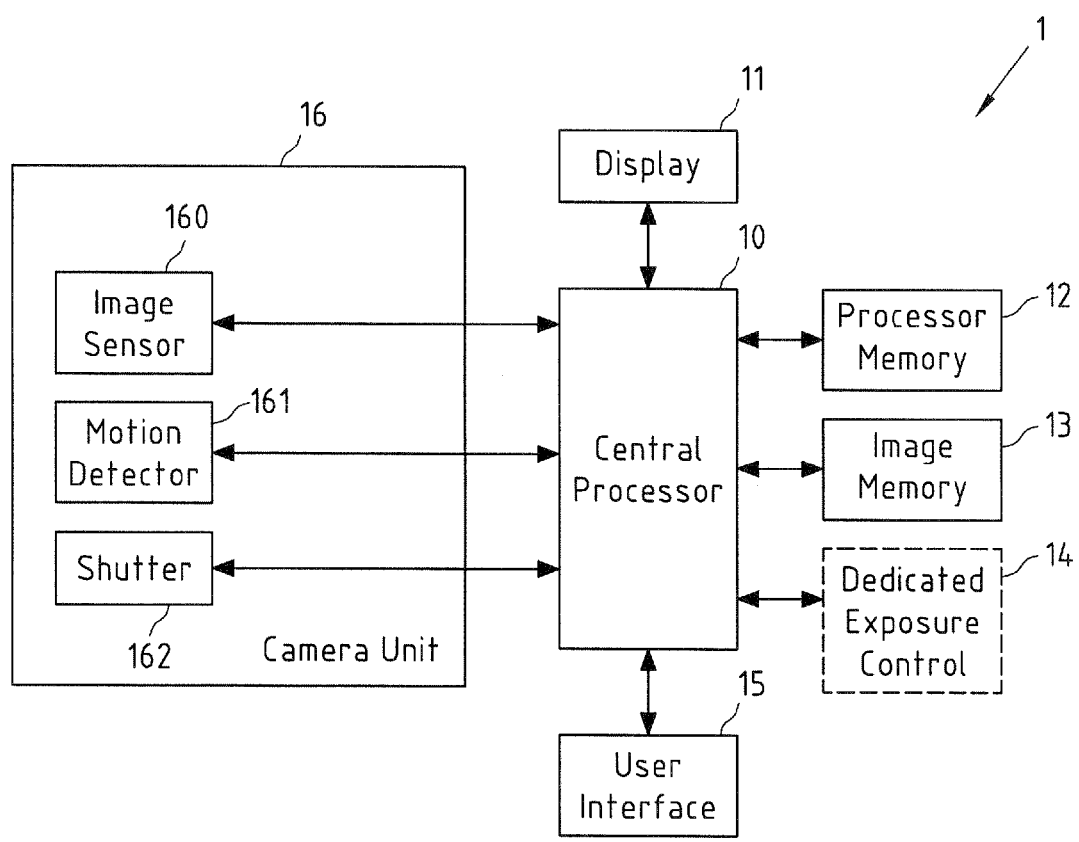
FIG. 1: a schematic block diagram of an exemplary embodiment of an apparatus according to the present invention.

FIG. 1 depicts a schematic block diagram of an exemplary embodiment of an apparatus 1 according to the present invention. Apparatus 1 comprises a camera unit 16 for capturing images, wherein the exposure time for the image capture is controlled according to the present invention.

Camera unit 16 comprises an image sensor 160, such as for instance a Charge Coupled Device (CCD) or a Complementary Metal-Oxide Semiconductor (CMOS) image sensor, which is configured to capture images projected onto its surface via according camera optics. Image sensor 160 may be equipped with an analog to digital converter for transforming signals representing a captured image into digital data.

Camera unit 16 can further comprises a motion detector 161 for detecting motion of the image target and/or apparatus 1. Motion detector 161 may for instance be embodied as motion sensor. Equally well, motion detection may be performed by central processor 10 based on the analysis of differences between subsequently captured images.

Camera unit 16 is furthermore equipped with a shutter unit 162, which controls the opening of a shutter according to a prescribed exposure time. During this exposure time, images are projected onto the surface of image sensor 160. Therein, the shutter can be implemented either mechanically or electronically. Furthermore, the shutter may be implemented either using rolling shutter or global shutter.

It is understood by those skilled in the art that camera unit 16 may comprise further functional units such as a flash unit for controlling a flash operation, and an auto focus unit for controlling an auto focus operation of camera unit 16, to name but a few possibilities.

Apparatus 1 further comprises a central processor 10 for controlling the overall operation of apparatus 1. In particular, central processor 1 is configured to determine one or more exposure times according to the present invention, as will be discussed with reference to the flowcharts of FIGS. 2 and 3 below, and to control image sensor 160, motion detector 161 and shutter unit 162 to allow capturing of one or more images with these one or more determined exposure times. In case that more than one images for a specific image target are captured with different exposure times, central processor 10 is further configured to merge the image data of these images into a resulting image with extended dynamic range. It should be noted that merging may also be performed in image sensor 160. This may require that there is a memory in image sensor 160. Alternatively, the long and short exposures for one pixel may be applied so that only a small buffer is needed or that no buffer is needed at all. It may also be possible to compress the captured dynamic of the pixel by using some compression method or by using some nonlinear function.

Apparatus 1 further comprises a display 11, a user interface 15 and an image memory 13 for storing captured images. Image memory 13 may for instance be a removable memory, such as for instance a memory stick or card. Display 11, user interface 15 and image memory 13 are all controlled by central processor 10.

Central processor 10 may run program code stored in processor memory 12, which may for instance be embodied as Random Access Memory (RAM), Read-Only-Memory (ROM), to name but a few possibilities. Processor memory 12 may equally well be embodied as a memory that is removable from apparatus 1. The program code stored in processor memory 12 may for instance define the way how central processor 10 controls the units of apparatus 1, and may particularly define how exposure control is performed by exposure control unit 110 of central processor 10 according to the present invention.

Apparatus 1 may for instance represent a digital camera, where display 11 then may function as a viewfinder and as a means for displaying captured images, and user interface 15 may comprise interaction elements such as a camera trigger, control elements for zooming and control elements for operating a menu structure. Therein, display 11 may also at least partially function as user interface, for instance by displaying a menu structure. Display 11 may also be embodied as a touch keypad and thus also function as a user interface.

Equally well, apparatus 1 may represent an electronic device that is additionally furnished with functionality to capture images. For instance, apparatus 1 may represent a mobile appliance such as a mobile phone, a personal digital assistant or a laptop computer. Therein, central processor 10 may then for instance be the standard processor for controlling the functioning of the mobile appliance, display 11 may be its standard display, and user interface 15 its standard user interface, such as for instance a keyboard or keypad. Similarly, memories 12 and 13 may be standard components already contained in the mobile appliance. In order to furnish the mobile appliance with the functionality to capture images, camera unit 16 may be added to the mobile appliance, and the program code in processor memory 12 may be accordingly altered to enable processor 10 to control camera unit 16 to capture images under usage of the exposure control according to the present invention.

Moreover, FIG. 1 illustrates that apparatus 1 may further comprise a dedicated exposure control unit 14, which may partially or entirely implement exposure control according to the present invention and thus may reduce the computational burden imposed on central processor 10. Dedicated exposure control unit 14 is however optional and thus depicted in dashed lines. Dedicated exposure control unit 14 may for instance implement the determination of one or more exposure times based on histograms and cost functions. To this end, dedicated exposure control unit 14 may for instance receive image data from image sensor 160 via central processor 10 to be able to determine a histogram of the light reception rates with respect to a specific image target, and may retrieve a plurality of cost functions from processor memory 12 via central processor 10. Equally well, unit 14 may receive the image data directly from image sensor 160, and/or may information on the cost function from its own memory. The determined one or more exposure times may be forwarded to central processor 10 for controlling shutter unit 162. Alternatively, dedicated exposure control unit 14 may control shutter unit 162 by itself. Dedicated exposure control unit 14 may furthermore implement the merging of multiple images of the same image target captured with different exposure times. Dedicated exposure control image 14 may for instance be embodied as a Digital Signal Processor (DSP), an Application Specific Integrated Circuit (ASIC) or a Field Programmable Gate Array (FPGA).

Figure 2:
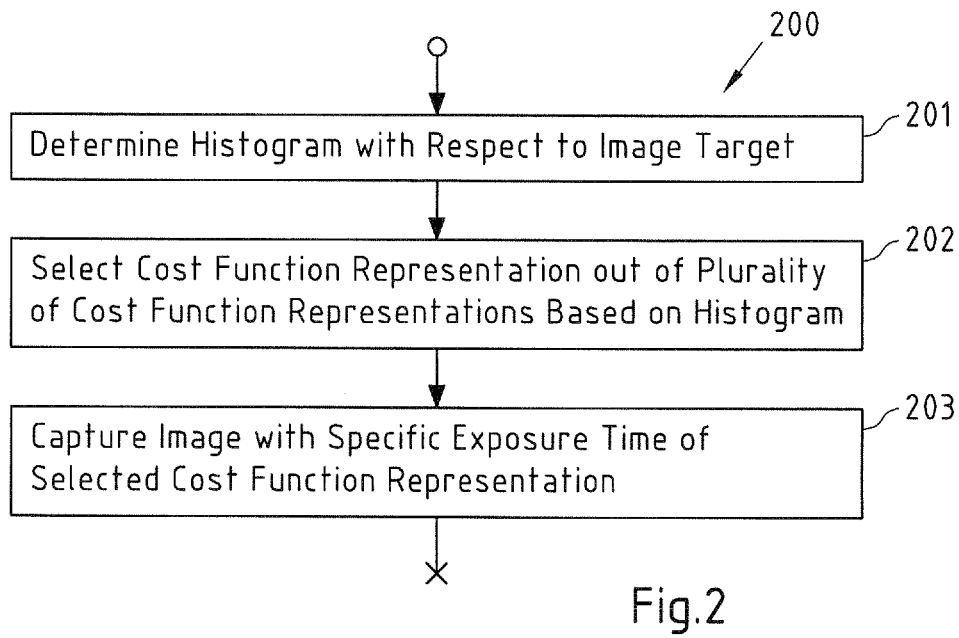
FIG. 2: a flowchart of an exemplary embodiment of a method according to the present invention.

FIG. 2 is a flowchart 200 of a first exemplary embodiment of a method according to the present invention. In this first exemplary embodiment, it is assumed that only one image of an image target is captured, so that only one exposure time has to be determined.

In a first step 201, a histogram with respect to an image target is determined. This step may for instance be performed by central processor 10 (see FIG. 1). Each ordinate value of the histogram represents the number of image sensor pixels that receive light from the image target at a light reception rate given as a corresponding abscissa value. This ordinate value then may be given as an absolute unit (pixels) or as a relative unit related to the overall number of pixels in the image sensor.

Figure 4B:
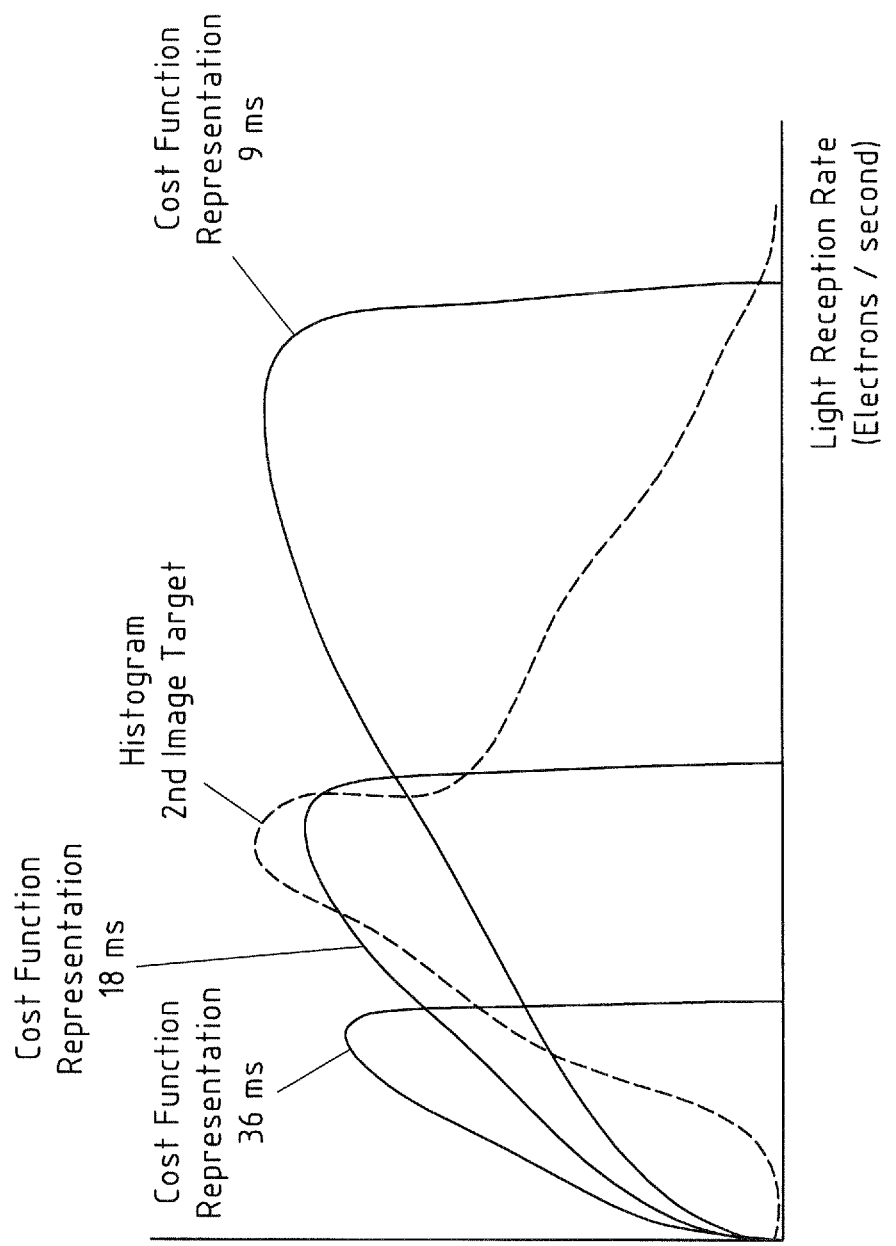
FIG. 4b: a further example of a histogram for an image target and of three cost function representations according to the present invention.

Examples of such a histogram are depicted in dashed lines in FIGS. 4a and 4b for a first image target and a second image target, respectively. From the two largest peaks of the histogram of the first image target in FIG. 4a, it can for instance be seen that a lot of pixels of the image sensor receive light at comparably low light reception rates, and that there exists a further large amount of pixels of the image sensor that receive light at comparably high light reception rates.

Therein, the histograms in FIGS. 4a and 4b exemplarily represent the reception of light by the green pixels of the image sensor, since the green pixels are activated most frequently and represent most of the luminance. Equally well, light received by red or blue pixels, or the sum or other weighted combinations of the light received by red, green and blue pixels could be considered when determining the histograms. The abscissa of the histogram plots of FIGS. 4a and 4b is exemplarily given in electrons per second. Equally well, it may be possible to use photons per second, although this measure may be more difficult to determine and may be demanding in real-time processing. The photons that are impinging on the image sensor may be filtered by optics, color filters, IR filters, so that it is less complex to consider the electrons collected from the impinging photons by the image sensor pixels. Therein, the quantum efficiency of the image sensor defines how many electrons can be retrieved from the impinging photons. The collected electrons may for instance be converted into digital values by floating diffusion and analog-to-digital conversion, and by considering the exposure time that was used for the determination of the histogram, the full well capacity of the image sensor and the dynamic range of the analog-to-digital converter, a corresponding light reception rate in electrons per second may be calculated. Therein, dark current may already be removed in the image sensor.

The histograms in FIGS. 4a and 4b may thus for instance be determined by capturing an image target during a fixed exposure time, and then determining, e.g. for a grid of equidistant numbers of electrons, from how many pixels of the image sensor the respective number of electrons was retrieved during the exposure time. This number of pixels then represents the ordinate value, and the number of electrons divided by the exposure time yields the corresponding abscissa value. Therein, it has to be noted that, if the overall exposure time for the determining of the histogram is chosen too large, saturation of the histogram may occur.

Returning to the flowchart 200 of FIG. 2, after the determination of the histogram in step 201, an exposure time for the image target is determined by selecting a cost function representation out of a plurality of cost function representations based on the determined histogram. Therein, each cost function representation out of the plurality of cost function representations expresses a performance of the image sensor as a function of the light reception rate for a specific exposure time.

Examples of such cost function representations for exposure times of 9, 18 and 36 ms are depicted in FIGS. 4a and 4b in solid lines. From these figures, it can readily be seen that the cost function representation for an exposure time of 9 ms indicates highest performance of the image sensor in the large light reception rate regime, and that the cost function representation for an exposure time of 36 ms indicates highest performance of the image sensor in the small light reception rate regime.

Cost function representations can be derived based on models of the cost function of the image sensor, or may be determined by measurements. Furthermore, generation of cost function representations by means of interpolation and extrapolation of already available cost function representations is possible.

The performance of the image sensor expressed by the cost function may for instance be a signal-to-noise ratio. The form of the cost function may depend, inter alia, on the full well capacity and the quantum efficiency of the image sensor, as well as on noise characteristics. For instance, the right part of the cost function may mostly be defined by the full well capacity and the quantum efficiency of the image sensor, wherein the abrupt decline at the rightmost border of the cost function may occur due to saturation. The left part of the cost function may decline because, in this comparably low light reception rate regime, only few photons may be received by the pixels of the image sensor and the amount of noise (e.g. due to a noise floor) may be more dominant.

The cost function may furthermore depend on the analog gain that is used during the capturing of images. Thus the cost function may depend on both the exposure time and the analog gain, and instead of only determining an exposure time based on the histogram and the cost function, it may equally well be possible to determine both an exposure time and an analog gain for capture of the image target based on the histogram and the cost function. Some sensors can also utilize digital gain. Digital gain may be used similarly like analog gain in the analysis.

Cost function representations for a specific exposure time may for instance be determined by measuring the full well capacity of the image sensor, yielding the right end of the cost function representation in the given exposure time. Then the noise floor may be measured (for instance by measuring how many electrons are output by the image sensor although there is no exposure), yielding the left end of the cost function representation. Photon shot noise (i.e. the square root of light electrons) and dark current shot noise (i.e. the square root of dark current electrons depending on the exposure time) may also be taken into account.

The plurality of cost function representations according to step 202 of flowchart 200 may for instance be stored in apparatus 1, for instance in processor memory 12 or in a memory of dedicated exposure control unit 14. The cost function representations may be constant; it may however be advantageous to modify or weight the cost function representations before determining an exposure time based on the cost function representations.

For instance, to account for motion of the image target and/or the apparatus 1 (see FIG. 1), it may be advantageous to measure the motion of the image target and/or the apparatus 1, which measurement may for instance be accomplished by motion detector 161 of apparatus 1 or by central processor 10 (e.g. via analysis of differences between subsequently captured images). In dependence on the amount of measured motion, the cost function representations may then be weighted with factors, e.g. ranging from 0 to 1.0, wherein cost function representations for small exposure times may be multiplied with larger weighting factors and cost function representations for large exposure times may be multiplied with smaller weighting factors.

An exemplary example of a choice of weighting factors in dependence on the measured amount of motion and the specific exposure time of the cost function representation is given in the following table:

| Amount of motion | Specific Exposure time (ms) | Weighting factor |
| --- | --- | --- |
| No motion | 6 | 1.00 |
| No motion | 36 | 1.00 |
| Average motion | 6 | 0.98 |
| Average motion | 36 | 0.70 |
| High motion | 6 | 0.95 |
| High motion | 36 | 0.40 |

The weighting of the cost function representations is advantageously performed prior to or during the determining of the exposure time based on the histogram and the cost function representations.

In step 202 of flowchart 200, a cost function representation is selected out of a plurality of cost function representations, wherein the selection is based on the determined histogram for the image target. A basic rule for the selection of the cost function representation may for instance be that a cost function representation is selected that reveals good performance of the image sensor in light reception rate regimes where the histogram has large ordinate values. Since each cost function representation is associated with a specific exposure time, by selecting a cost function representation, also a specific exposure time is selected. For this specific exposure time, it is then guaranteed that for a large amount of pixels of the image sensor (as indicated by the ordinate values of the histogram), an exposure time is chosen that leads to a high performance of the image sensor.

A straightforward way to implement the selection of the cost function representation out of the plurality of cost functions is to determine, for each cost function representation, and for each abscissa value, the product between the cost function representation and the histogram and to sum the resulting product values to obtain a sum value. The largest sum value of all cost function representations then identifies the cost function representation (and the associated exposure time) that is optimally suited for the histogram.

For example, for the histogram of the first image target in FIG. 4a and the histogram of the second image target in FIG. 4b, applying the above-described selection approach reveals that selection of the cost function representation for an exposure time of 9 ms is a good choice. Of course, the cost function representations for exposure times of 36 ms and 18 ms can show the smaller light reception rates better (cf. the big peaks of the histogram), but if only one exposure time can be used it is advantageous to use an exposure time of 9 ms for avoiding a huge amount of saturated pixels.

It should be noted that there exist a plurality of further techniques of selecting the cost function representation from the plurality of cost function representations.

In a final step 203 of flowchart 200, an image of the image target is captured with the exposure time that is associated with the cost function representation that was selected in step 202. Image capture may for instance be triggered by central processor 10 of apparatus 1 (see FIG. 1) by controlling shutter unit 162 and image sensor 160 of camera unit 16 accordingly. Equally well, image capture may be triggered by dedicated exposure control unit 14.

After the capture of the image in step 203 of flowchart 200, the captured image may for instance be stored in image memory 13 of apparatus 1 (see FIG. 1), and may optionally be displayed via display 11.

In the exemplary embodiment described with reference to the flowchart 200 of FIG. 2, it was exemplarily assumed that a plurality of cost function representations is available, from which an optimal cost function representation is selected based on the determined histogram. According to the present invention, it may equally well be the case that only one cost function representation for one specific exposure time is available, and that the exposure time is then determined based on the single cost function representation only. This may for instance comprise extrapolation or estimation of cost function representations for specific exposure times for which no cost function representations are available.

For instance, in the scenario of FIG. 4a, if only the cost function representation for 6 ms is available (not shown in FIG. 4a), it may be determined, based on the histogram for the first image target and this single cost function representation, that a larger exposure time (e.g. 9 ms) than 6 ms has to be applied to adequately capture the first image target, since the peak of the cost function representation is known to be shifted towards smaller light reception range regimes with increasing exposure times. Therein, it may be advantageous if a cost function representation of a comparably small exposure time (e.g. 6 ms) is available, so that the amount of saturated pixels in the measured image is small. Based on a cost function representation with a comparably short exposure time (and corresponding low degree of pixel saturation), cost function representations for larger exposure times may thus be predicted.

It is also possible that the exposure time is determined based on the determined histogram and an analytical model of the cost function, for instance by extracting a range of light reception rates from the histogram with high associated histogram ordinate values and calculating, based on the analytical model of the cost function, for which specific exposure time the cost function has high performance in this range of light reception rates.

Figure 3:
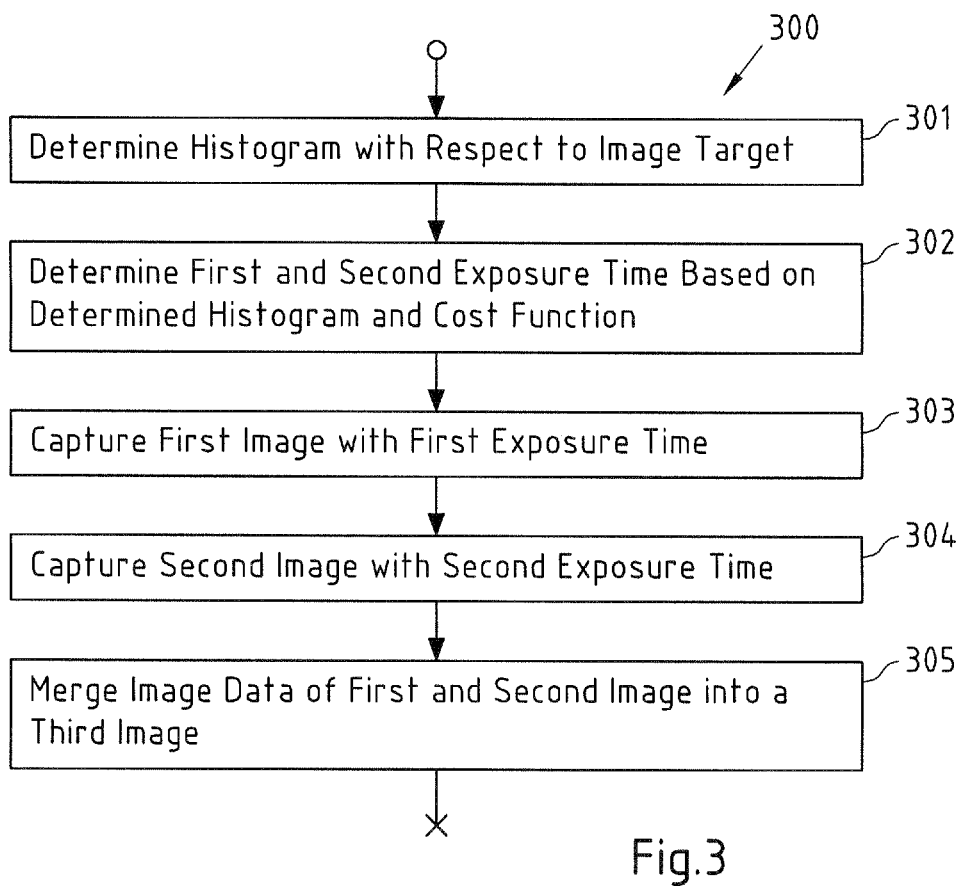
FIG. 3: a flowchart of a further exemplary embodiment of a method according to the present invention.

FIG. 3 illustrates a flowchart 300 of a further exemplary embodiment of a method according to the present invention. In this further exemplary embodiment, it is exemplarily assumed that two images are to be captured, and that the two images are merged in order to increase the dynamic range as compared to the single capture case. Furthermore, it is assumed that a plurality of cost function representations is available, from which two cost function representations and thus two associated exposure times are selected, which exposure times are then used in the capture of the two images of the image target. It is readily understood by a person skilled in the art that, according to the present invention, it is equally well possible to determine exposure times for more than two images and to accordingly capture more than two images. It can also be understood by a person skilled in the art that one image can also be captured by using two or even more exposure times and so the AD conversion may cause a known nonlinear response for all or a group of pixels.

In a first step 301, a histogram with respect to the image target that is to be captured is determined. This step is completely analog to step 201 of flowchart 200 of FIG. 2, so that the description of step 201 is readily applicable to step 301 of flowchart 300.

In a second step 302, first and second exposure times are determined based on the histogram determined in step 301 and on the cost function.

The benefit of multiple capture with different exposure times is readily visible from the exemplary histograms and cost function representations in FIGS. 4a and 4b. For instance, capturing the first image target in FIG. 4a with an exposure time of 36 ms only, ignores that there exists a significant amount of pixels that receive light at high reception rates (see the peak in the right part of the histogram for the first image target). Light with high light reception rates leads to a quick saturation of the corresponding pixels of the image sensor, so that, when only capturing a single image with an exposure time of 36 ms, no bright detail will be available from these pixels. In contrast, when additionally capturing a second image of the image target with a short exposure time of 9 ms, the corresponding cost function representation of the image sensor has its peak shifted rightwards, so that also high light reception rates can be adequately covered. The pixels of the image sensor that receive the light at high light reception rates than will, due to the short exposure time, also provide sufficient detail in the bright part, since saturation of pixels is prevented.

A similar observation holds for the histogram of the second image target in FIG. 4b, where the cost function representations for 9 and 18 ms will produce best results.

The first and second exposure times can for instance be determined by selecting, from a plurality of cost function representations (in case of FIGS. 4a and 4b three cost function representations are available), first and second cost function representations that are considered to yield optimum increase of dynamic range.

This may be accomplished in a plurality of ways. For instance, it may be advantageous to select, from the plurality of cost function representations, a combination of two cost function representations so that a sum value is maximized, wherein the sum value for each combination is obtained by:

applying a maximum-value function to the two cost function representations to obtain a maximum-value cost function representation, i.e. selecting, for each abscissa value of the two cost function representations, the larger one of the two associated cost function representation values (e.g. when performing this with the cost function representations for 9 and 36 ms in FIG. 4a, the resulting maximum-value cost function representation would be equal to the cost function representation for 36 ms in the low light reception range regime and, starting from the intersection of both cost function representations, would be equal to the cost function representation for 9 ms in the higher light reception range regime), multiplying, for each light reception rate in a range of available light reception rates (e.g. the complete abscissa in FIG. 4a), the histogram value associated with the light reception rate and the maximum-value cost function representation value associated with the light reception rate, and summing the products obtained for each light reception rate in the considered range of light reception rates.

Thus by forming a plurality of different combinations of the available cost function representations (or also of interpolated versions thereof), and by identifying the maximum combination-specific sum value, the best combination of cost function representations for the histogram and thus the best two exposure times for the capture of the image target can be determined.

An alternative approach for determining the first and second exposure times for two-fold capture of the image target will be described as follows.

For instance, an iterative method may be used to determine the first and second exposure times. In a first round, some first exposure time is used, which is preferably a small exposure time so that the corresponding cost function representation covers most of the area of the histogram (since the exposure time is small, there may not be so many saturated pixels). Then the cost function representation for the second exposure time is searched. This may for instance be accomplished as described above, i.e. by forming a maximum-value cost function representation of the already determined cost function representation for the first exposure time and cost function representation candidates for the second exposure time and checking what sum value this maximum-value cost function representation yields when element-wise multiplied with the histogram and accordingly summed over the abscissa.

The search of the exposure times should be started by using full dynamic (a very short exposure time) for the first exposure time and by finding as long exposure time that is possible with the available sensor for the next exposure time.

When the cost function representation with full dynamic has been found, wherein full dynamic means that there are no saturated pixels, it can then be improved by increasing the used short exposure time ($t1$) as much as possible while still not causing saturation. The point (the shortest exposure time) where saturation starts may for instance be defined from the determined (e.g. measured) histogram values in the following way: Divide the rate value that utilizes full well capacity in the cost function representation of the current exposure time by the brightest rate value in the histogram and multiply the result by the current exposure time. For instance, in FIG. 4a, when the current exposure time is 9 ms, the rate value based on the current exposure time (9 ms) utilizing full well capacity is the rate value where the cost function representation ends (i.e. the right end of the solid line). The brightest rate value is the value where the histogram ends (i.e. the right end of the dashed line). So the point (=shortest exposure time) where saturation starts is roughly given as $1.04 \times 9$ ms=$9.36$ ms.

Then the cost function representation for that exposure time is calculated based on the one or more available (e.g. measured) cost function representations or interpolations/extrapolations thereof. Then the second exposure value is tried to estimate (only a set of available exposure times is possible, e.g. $2 \times t1$, $4 \times t1$, $8 \times t1$) based on the available information so that the sum value of the combination of the two cost function representations is maximized. Therein, the optimal second exposure time may often be dependent on the area of the histogram where the largest amount of pixel values are available. This means that the peak in the histogram may often define which exposure should be used (slightly shorter exposure time than the position of peak): E.g. in FIG. 4a, the histogram peak just before the cost function representation for 36 ms and in FIG. 4b the histogram peak just before the cost function representation for 18 ms exposure time. This may be due to the fact that the right end of the cost function is determined by the exposure time and the full well capacity. But because the form of histogram can be arbitrary then the cost function representation effectively finds the best combination.

In the above-described approach, it is exploited that there is a set of cost function representations available and that the cost function representation for other exposure times may be interpolated based on the available information. Equally well, the cost function representations may be fully modelled (estimated) by mathematical function if it is possible.

In steps 303 and 304, then a first image and a second image of the image target are captured with respective exposure times as determined (e.g. via the selection of the two cost function representations) in step 302.

In a step 305, then image data of the first and second image is merged into a third image to increase the dynamic range as compared to the single capture case. This may for instance be performed on a pixel-per-pixel basis, but also for groups of pixels. The rationale behind this approach is that pixels from the image with shorter exposure (which are likely to reveal more detail in bright image parts) and pixels from the image with larger exposure (which are likely to reveal more detail in dark image parts) are combined into a high-dynamic output image.

Two exemplary approaches of merging will be outlined below.

A first approach can be described by the following rule:

if($x_2$<max-$thr_1$) then $x=x_2$ else $x=x_1 \cdot t_2/t_1$

Therein, $x_1$ denotes the pixel value in the first image captured with an exposure time $t_1$, $x_2$ denotes the pixel value in the second image captured with an exposure time $t_2$ ($t_2 > t_1$), x denotes the merged pixel value, max is the maximum value that the analog-to-digital converter in the image sensor can represent, and $thr_1$ is a security margin that is used to prevent cases when $x_2$ is not full although is should be (e.g. due to nonlinear image sensor response).

Thus when the dynamic of the analog-to-digital converted is sufficient to represent $x_2$ (from the longer exposed image), $x_2$ is used, and otherwise a scaled version of $x_1$ (from the shorter exposed image) is used, wherein the scaling factor $t_2/t_1$ indicates that the increase in dynamic range in bits that can be achieved by merging the two images is $\log_2(t_2/t_1)$. Thus if the second exposure time $t_2$ is twice the first exposure time $t_1$, an increase in dynamic range of 1 bit is achieved.

A second approach of merging can be expressed as follows:

if abs($y_1-y_2$)<$thr_2$ then $x=y_2$ else $x=\max(y_1,y_2)$

Therein, in addition to the notation of the previous approach, $y_1=x_1 \cdot t_2/t_1$ and $y_2=x_2$ hold, abs ( ) returns the absolute value of its argument, max( ) returns the larger one of its two arguments, and $thr_2$ is a security margin so that the more accurate number is used.

Thus in case of insignificant difference between $y_1$ and $y_2$, $y_2$ is used, and otherwise the maximum value of $y_1$ and $y_2$ is used, where $y_2$ is the scaled version of $x_1$ with a scaling factor of $t_2/t_1$, so that once again an increase in dynamic range in bits of $\log_2(t_2/t_1)$ can be achieved. In the above examples, t2 represents the longer exposure time and t1 represents the shorter exposure time. Nevertheless, the actual order of exposures can be t1, t2 or t2, t1.

Thus when merging the images captured with exposure times of 9 ms and 36 ms, respectively (see FIG. 4a), an increase in dynamic range of 2 bit is achieved, and by merging the images captured with exposure times of 9 ms and 18 ms, respectively (see FIG. 4b), an increase in dynamic range of 1 bit is achieved.

After the merging of the image data in step 305 of flowchart 300, the merged image may for instance be stored in image memory 13 of apparatus 1 (see FIG. 1), and may optionally be displayed via display 11.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

Furthermore, it should be noted that the methods disclosed in the context of the present invention may be implemented in a variety of hardware realizations, as for instance in a camera module, an external accelerator, an imaging engine, an application processor, a baseband processor, to name but a few.

The invention claimed is:

1. A method, comprising:
    determining a histogram of the number of image sensor area elements of an image sensor that receive light at specific light reception rates from an image target; and
    determining at least one exposure time for capture of said image target based on said histogram and on at least one cost function, of a plurality of cost functions, that expresses a performance of said image sensor as a function of light reception rate per image sensor area element and exposure time,
    where said cost function is selected:
        by multiplying, for each cost function in said plurality of cost function, and for a range of light reception rates, the respectively associated histogram value and the respectively associated value of said cost function and summing up the resulting multiplication products to obtain a sum value;
        by comparing said sum values of all of said cost functions in said plurality of cost functions to identify the largest sum value, and
        by selecting the cost function that produced said largest sum value.

2. A computer-readable medium having a computer program stored thereon, the computer program comprising: instructions operable to cause a processor to determine a histogram of the number of image sensor area elements of an image sensor that receive light at specific light reception rates from an image target; and instructions operable to cause a processor to determine at least one exposure time for capture of said image target based on said histogram and on at least one cost function, of a plurality of cost functions, that expresses a performance of said image sensor as a function of light reception rate per image sensor area element and exposure time,
    where said cost function is selected:
        by multiplying, for each cost function in said plurality of cost function, and for a range of light reception rates, the respectively associated histogram value and the respectively associated value of said cost function and summing up the resulting multiplication products to obtain a sum value;
        by comparing said sum values of all of said cost functions in said set of cost functions to identify the largest sum value, and
        by selecting the cost function that produced said largest sum value.

3. An apparatus, comprising: a processing unit configured to: determine a histogram of a number of image sensor area elements of an image sensor that receive light at specific light reception rates from an image target; and to determine at least one exposure time for capture of said image target based on said histogram and on a cost function that expresses a performance of said image sensor as a function of light reception rate per image sensor area element and exposure time, wherein said processing unit is configured to determine said at least one exposure time based on said histogram and on a plurality of cost function representations, wherein each of said cost function representations expresses a performance of said image sensor as a function of light reception rate per image sensor area element for a specific exposure time, wherein said processing unit is configured to select said cost function representation by multiplying, for each cost function representation in said plurality of cost function representations, and for a range of light reception rates, the respectively associated histogram value and the respectively associated value of said cost function representation and summing up the resulting multiplication products to obtain a sum value; by comparing said sum values of all cost function representations in said set of cost functions to identify the largest sum value, and by selecting the cost function representation that produced said largest sum value.

4. The apparatus according to claim 3, wherein at least one of said cost function representations is based on measurements or on an analytical model of said cost function or is obtained from interpolation or extrapolation of other cost function representations.

5. The apparatus according to claim 3, wherein said processing unit is configured to determine only one exposure time, and wherein said processing unit is configured to determine said one exposure time by selecting, based on said histogram, a cost function representation out of said plurality of cost function representations and by determining said specific exposure time of said selected cost function representation as said one exposure time.

6. The apparatus according to claim 3, wherein said processing unit is configured to determine first and second exposure times for respective first and second captures of said image target.

7. The apparatus according to claim 6, further comprising a camera unit configured to capture said image target with said first exposure time to obtain a first image and to capture said image target with said second exposure time to obtain a second image; and wherein said processing unit is further configured to merge image data of said first and second images into a third image.

8. The apparatus according to claim 7, wherein said camera unit is configured to capture said first image and said second image without temporal overlap or with temporal overlap.

9. The apparatus according to claim 7, wherein said processing unit is configured to merge said image data of said first and second image by using, in case of image data of said second image falling below a pre-defined threshold, said image data of said second image as image data for said third image; and by using, in case of image data of said second image equaling or exceeding said pre-defined threshold, a scaled representation of image data of said first image as image data for said third image, wherein the ratio between said second exposure time and said first exposure time is used as scaling factor.

10. The apparatus according to claim 7, wherein said processing unit is configured to merge said image data of said first and second image by using, in case of a difference between image data of said second image and a scaled representation of image data of said first image falling below a pre-defined threshold, said image data of said second image as image data for said third image, wherein the ratio between said second exposure time and said first exposure time is used as scaling factor; and by using, in case of said difference between said image data of said second image and said scaled representation of said image data of said first image equaling or exceeding said pre-defined threshold, the maximum value of said image data of said second image and said scaled representation of said image data of said first image as image data for said third image.

11. The apparatus according to claim 3, wherein said processing unit is configured to determine first and second exposure times for respective first and second captures of said image target, and wherein said processing unit is configured to determine, based on said histogram and said cost function, one of said first and second exposure times as the largest possible exposure time that still does not cause pixel saturation.

12. The apparatus according to claim 3, wherein said processing unit is configured to determine first and second exposure times for respective first and second captures of said image target by selecting, based on said histogram, first and second cost function representations out of said plurality of cost function representations and by determining said specific exposure times of said selected first and second cost function representations as said first and second exposure times.

13. The apparatus according to claim 12, wherein said processing unit is configured to select said first and second cost function representations by forming a plurality of different combinations of two cost function representations out of said plurality of cost function representations; determining, for each combination of cost function representations, a sum value by applying a maximum-value function to the two cost function representations to obtain a maximum-value cost function representation, by multiplying, for a range of light reception rates, the respectively associated histogram value and the respectively associated maximum-value cost function representation value and by summing the resulting products; and selecting the two cost function representations of that combination of cost function representations that yields the largest sum value.

14. The apparatus according to claim 3, further comprising a motion detector configured to detect motion of at least one of said image target and said image sensor; wherein said processing unit is configured to weight said cost function representations in dependence on said detected motion prior to or during said determining of said at least one exposure time.

15. The apparatus according to claim 3, wherein said performance of said image sensor is related to a signal-to-noise ratio of said image sensor.

16. The apparatus according to claim 3, wherein said cost function expresses a performance of said image sensor as a function of light reception rate per image sensor area element, exposure time and analog gain of said image sensor, and wherein said processing unit is configured to determine at least one exposure time and at least one analog gain for capture of said image target based on said histogram and on said cost function.

17. The apparatus according to claim 3, wherein said apparatus is a digital camera or an electronic device that is equipped with a digital camera.

18. The apparatus according to claim 3, wherein said apparatus is a module for a digital camera or for an electronic device that is equipped with a digital camera.

* * * * *